(12) United States Patent
Okano

(10) Patent No.: US 6,457,370 B1
(45) Date of Patent: Oct. 1, 2002

(54) METHOD AND DEVICE FOR MEASURING WORKING FORCE OF MECHANICAL PRESS

(75) Inventor: Shinji Okano, Kobe (JP)

(73) Assignee: Kabushiki Kaisha KOSMEK, Hyogo (JP)

( * ) Notice: Subject to any disclaimer, the term of this patent is extended or adjusted under 35 U.S.C. 154(b) by 0 days.

(21) Appl. No.: 09/556,523

(22) Filed: Apr. 21, 2000

(30) Foreign Application Priority Data

Apr. 28, 1999 (JP) .......................................... 11-121756

(51) Int. Cl.$^7$ ................................................ G01N 3/00
(52) U.S. Cl. ........................................................ 73/816
(58) Field of Search .............................. 73/816; 100/53, 100/346, 50; 72/21.5, 19.9, 16.1, 351, 21; 60/328

(56) References Cited

U.S. PATENT DOCUMENTS

| | | |
|---|---|---|
| 4,085,669 A | 4/1978 | Yonezawa |
| 4,593,547 A * | 6/1986 | Heiberger .................... 72/1 |
| 4,823,687 A | 4/1989 | Yonezawa et al. |
| 4,827,839 A | 5/1989 | Yonezawa et al. |
| 5,620,024 A | 4/1997 | Yonezawa |
| 5,638,748 A * | 6/1997 | Daniel ......................... 100/53 |
| 5,692,405 A * | 12/1997 | Kirii ........................... 72/16.1 |

FOREIGN PATENT DOCUMENTS

JP          50-38228          8/1975

* cited by examiner

Primary Examiner—Benjamin R. Fuller
Assistant Examiner—Octavia Davis
(74) Attorney, Agent, or Firm—Bacon & Thomas, PLLC

(57) ABSTRACT

Pressurized oil is charged into a hydraulic chamber (12) formed within a slide (3) of a mechanical press (1). relationship between a working force (F) during a press working and a pressure (P) of the pressurized oil is preliminarily measured for every predetermined initial pressure of the pressurized oil. A computer (33) stores the measured results as a plurality of pressurizing characteristics (A1), (A2) and (A3). The computer (33) stores through a pressure sensor (27), a pressure of the pressurized oil while a press working is not performed, as a preload pressure (P$a$1). And it stores a maximum pressure of the pressurized oil during the press working as a peak pressure (P$b$1). It further selects a pressurizing characteristic (A1) corresponding to the preload pressure (P$a$1) from among the plurality of pressurizing characteristics and thereafter calculates a working force (F1) based on the selected pressurizing characteristic (A1) and the peak pressure (P$b$1).

8 Claims, 3 Drawing Sheets

F I G. 1
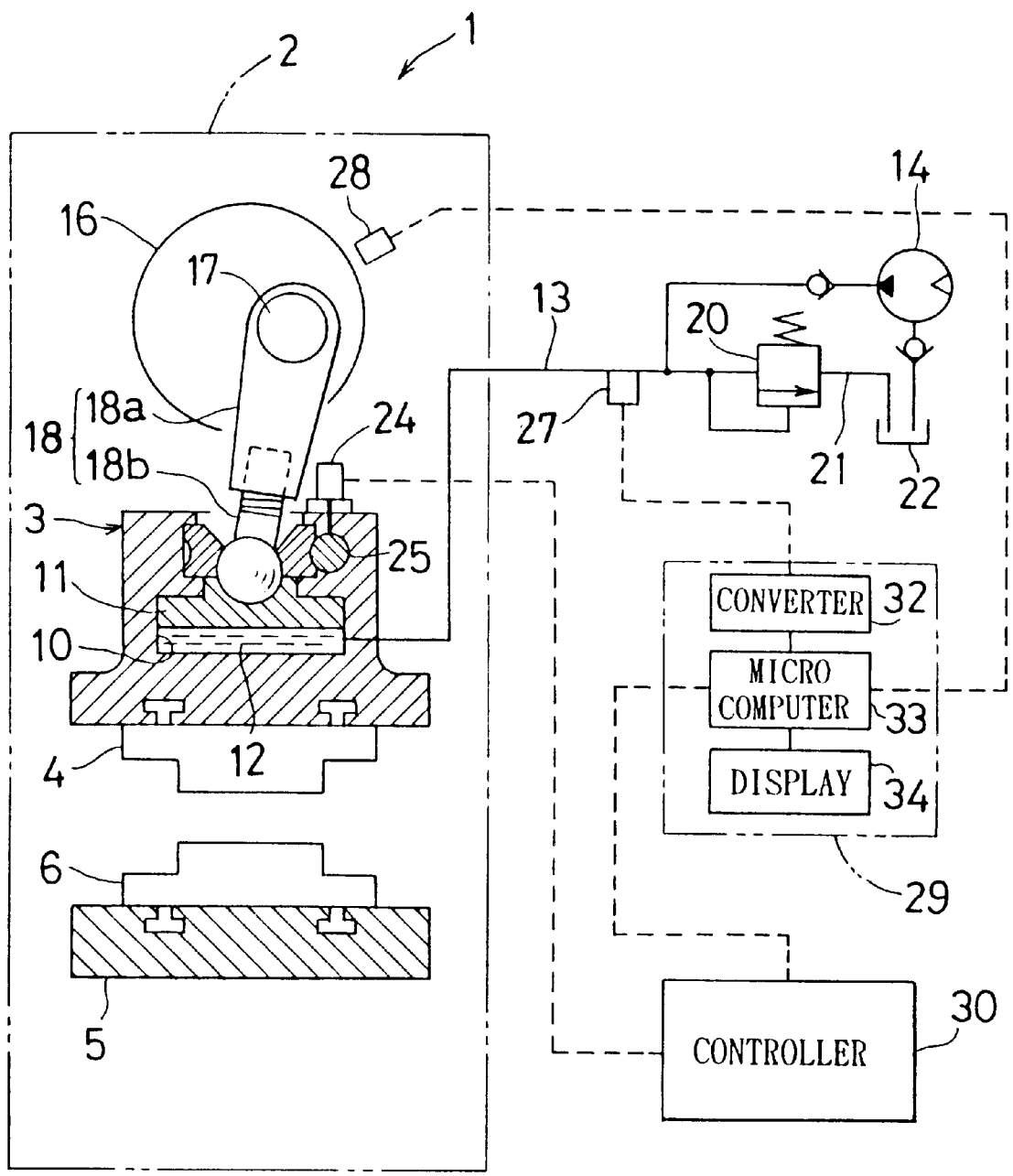

METHOD AND DEVICE FOR MEASURING WORKING FORCE OF MECHANICAL PRESS

BACKGROUND OF THE INVENTION

1. Technical Field

The present invention relates to a method and a device for measuring a largeness of a working force during a press working of a mechanical press.

2. Description of the Earlier Technology

Conventionally, a strain gauge has been adhered to a pressure receiving structural portion such as a frame and a connecting rod of a mechanical press. When the pressure receiving structural portion undergoes a strain with a load imposed thereon, the strain has been detected to thereby measure a working force during a press working.

The conventional technique has a problem that it needs much labor so as to measure the working force and besides encounters a large measurement error.

More specifically, when adhering the strain gauge to the frame, the measured values greatly vary in correspondence with the portions where the strain gauge is adhered. Further, when adhering the strain gauge to the connecting rod, there may be caused a case where it is difficult to adequately adhere the strain gauge depending on the sectional shape of the connecting rod. Additionally, in accordance with the kind of the press working such as shearing and bending, the strain occurs at varying parts of the frame and the connecting rod and in changing largeness.

In consequence, the conventional technique must search a proper portion for adhering the strain gauge and calibrate the measured values by conducting many test workings in advance and detailedly comparing the values measured during the test workings with the actual working forces. Therefore, it takes much labor to measure the working force and besides a large measurement error occurs due to the above-mentioned various variations and changes.

Additionally, the conventional technique experiences a far larger measurement error of the working force because the strain of the pressure receiving structural portion varies depending on the change of the atmospheric temperature of the place where the mechanical press is installed and on the temperature increase of a driving force transmission system while the press working is performed.

Japanese Patent Publication No. 50-38228 discloses an invention which converts a load of a mechanical press to an oil pressure and stops the operation of the mechanical press when overload is produced. However, this invention is not adapted so as to be able to measure a working force during a press working.

SUMMARY OF THE INVENTION

The present invention has an object making it possible to precisely and easily measure the working force during the press working.

In order to accomplish the object, an invention of claim 1 has constructed a method for measuring a working force of a mechanical press in the following manner, for example, as shown in FIGS. 1 to 3.

A mechanical press 1 has a slide 3 within which an overload absorbing hydraulic chamber 12 is provided. The mechanical press 1 transmits its driving force to the slide 3 through pressurized oil charged into the hydraulic chamber 12. In correspondence with an initial pressure of the pressurized oil to be charged, a computer 33 stores a relationship between a pressure (P) of the pressurized oil which has been pressurized with a working force (F) during a press working and a largeness of the working force (F) as at least one pressurizing characteristic (A1, A2, A3, A4, A5, A6). When the computer 33 calculates each working force during a press working, first, a pressure of the pressurized oil is sensed before every press working and the sensed pressure is stored as a preload pressure (Pa1). Next, a maximum pressure of the pressurized oil which has been pressurized during the press working is sensed and the sensed pressure is stored as a peak pressure (Pb1). Thereafter, the computer 33 calculates a working force (F1) based on a pressurizing characteristic (A1) corresponding to the preload pressure (Pa1) and on the peak pressure (Pb1).

The method of the invention produces the following function and effect.

This invention makes it possible to calculate a working force during a press working by sensing a pressure of the pressurized oil within the hydraulic chamber. Accordingly, differently from the above-mentioned conventional technique of strain-gauge type, it can calculate the working force without taking a trouble to conduct many test workings. Besides, it can do the calculation irrespective of the change of the atmospheric temperature of the place where the mechanical press is installed and the temperature change of the driving force transmission system which occurs while the press working is performed. In addition, each time the mechanical press performs a press working, a preload pressure before the press working is taken in to calculate a working force during the press working. Therefore, no error is caused by the change of the preload pressure to result in the possibility of precisely and easily calculating an actual working force.

An embodiment for measuring a working force of a mechanical press is shown in FIGS. 1 to 3.

The device comprises an overload absorbing hydraulic chamber 12 provided within a slide 3 of the mechanical press 1, pressurized oil charged into the hydraulic chamber 12 and transmitting a press driving force to the slide 3, a pressure sensing means 27 for sensing a pressure of the pressurized oil and a computer 33 which operates based on the sensed signal of the pressure sensing means 27. In correspondence with an initial pressure of the pressurized oil to be charged, the computer 33 stores a relationship between a pressure (P) of the pressurized oil which has been pressurized with a working force (F) during a press working and a largeness of the working force (F) as at least one pressurizing characteristic (A1, A2, A3, A4, A5, A6). The computer 33 calculates a working force (F1) based on a pressurizing characteristic (A1) corresponding to a preload pressure (Pa1) sensed before every press working and on a peak pressure (Pb1) of the pressurized oil which has been pressurized during the press working.

More specifically, this invention can calculate a working force during a press working through sensing a pressure of the pressurized oil within the hydraulic chamber by the pressure sensing means. Accordingly, differently from the above-mentioned conventional technique of strain-gauge type, it can calculate the working force without taking a trouble to conduct many test workings. Besides, it can do the calculation irrespective of the change of the atmospheric temperature of the place where the mechanical press is installed and the temperature change of the driving force transmission system which occurs while the press working is performed. In addition, each time the mechanical press performs a press working, a preload pressure before the working is taken in to calculate a working force during the press working. Therefore, no error is caused by the change of the preload pressure to result in the possibility of precisely and easily calculating an actual working force.

Another embodiment of the present invention is preferably constructed in the following manner.

The computer 33 stores a plurality of pressurizing characteristics (A1), (A2), (A3), (A4), (A5) and (A6) for predetermined initial pressures of the pressurized oil to be charged, respectively. It selects at least one pressurizing characteristic (A1) corresponding to the preload pressure (Pa1) from among the plurality of pressurizing characteristics (A1), (A2), (A3), (A4), (A5) and (A6), and calculates a working force (F1) based on the selected at least one pressurizing characteristic (A1) and the peak pressure (Pb1).

This embodiment provides the computer with a plurality of pressurizing characteristics. Therefore, even if the initial pressure for charging the pressurized oil into the hydraulic chamber is changed or even if the initial pressure varies over a wide range, it can immediately adapt itself to the change and the variation. This can adapt the present invention promptly to a mechanical press of different capacity and to a press working of different kind.

Another embodiment of the present invention is preferably constructed in the following manner.

The computer 33 is connected to an actuator 24 for adjusting a die height. The calculated working force (F1) is compared with either a set range (X) or at least one set value. Based on the comparison, the actuator 24 is driven to thereby retain the working force (F) during the press working within a desired range.

Even if the mechanical press deforms due to thermal strain or a work to be supplied changes in thickness and hardness, the die height adjusting actuator adjusts the die height based on the precisely calculated working force, thereby being able to keep the working force within the desired range. This makes the working force during the press working almost constant and improves the working accuracy.

Another embodiment of the present invention is preferably constructed in the following manner.

In the case where the calculated working force (F1) is close to an upper limit value of the set range (X), the actuator 24 is driven in a direction for increasing the die height, and on the other hand in the case where the calculated working force (F1) is close to a lower limit value of the set range (X), the actuator 24 is driven in a direction for decreasing the die height, so as to retain the working force (F) during the press working within the set range (X).

This embodiment predicts a tendency of variation of the working force in advance, thereby being able to retain the working force within the set range. This results in further improving the working accuracy.

Another embodiment of the present invention is preferably constructed in the following manner.

Two set values of an upper limit value and a lower limit value are provided as the set value. In the case where the calculated working force (F1) is not less than the upper limit value, the actuator 24 is driven in a direction for increasing the die height, and on the other hand in the case where the calculated working force (F1) is not more than the lower limit value, the actuator 24 is driven in a direction for decreasing the die height, so as to retain the working force (F) during the press working within the desired range.

This embodiment maintains the working force within the desired range only by providing the two set values of the upper and lower limit values. Thus the working accuracy can be improved with a simple construction.

Another embodiment of the present invention is preferably constructed in the following manner.

The sensed preload pressure (Pa1) is compared with an initial pressure of the at least one pressurizing characteristic (A1, A2, A3, A4, A5, A6) and the working force (F1) is calculated based on a pressurizing characteristic obtained by the comparison and on the peak pressure (Pb1).

This embodiment includes a new pressurizing characteristic or selects a specific pressurizing characteristic through the comparison, thereby being able to calculate a working force based on a pressurizing characteristic most corresponding to the sensed preload pressure. This makes it possible to calculate an actual working force during a press working more precisely.

Another embodiment of the present invention is preferably constructed in the following manner.

The computer 33 is connected to an actuator 24 for adjusting a die height. The calculated working force (F1) is compared with either a set range (X) or at least one set value. Based on the comparison, the actuator 24 is driven to thereby retain the working force (F) during the press working within a desired range.

Even if the mechanical press deforms due to thermal strain or a work to be supplied changes in thickness and hardness, the die height adjusting actuator adjusts the die height based on the precisely calculated working force, thereby being able to keep the working force within the desired range. This makes the working force during the press working almost constant and improves the working accuracy.

Another embodiment of the present invention is preferably constructed in the following manner.

The sensed preload pressure (Pa1) is compared with an initial pressure of the at least one pressurizing characteristic (A1, A2, A3, A4, A5, A6). And the working force (F1) is calculated based on a pressurizing characteristic obtained by the comparison and on the peak pressure (Pb1).

It is possible to calculate a working force based on a pressurizing characteristic most corresponding to the sensed preload pressure by seeking a new pressurizing characteristic or selecting a specific pressurizing characteristic through the comparison. This makes it possible to calculate an actual working force during a press working more precisely.

BRIEF DESCRIPTION OF THE DRAWINGS

FIGS. 1 to 3 show an embodiment of the present invention;

FIG. 1 is a system diagram of a device for measuring a working force of a mechanical press;

FIG. 2 is a graphic view showing a relationship between a working force during a press working and a pressure of pressurized oil within a hydraulic chamber; and FIG. 3 is a flow chart of the measuring device.

DESCRIPTION OF THE PREFERRED EMBODIMENTS

Figure 2:
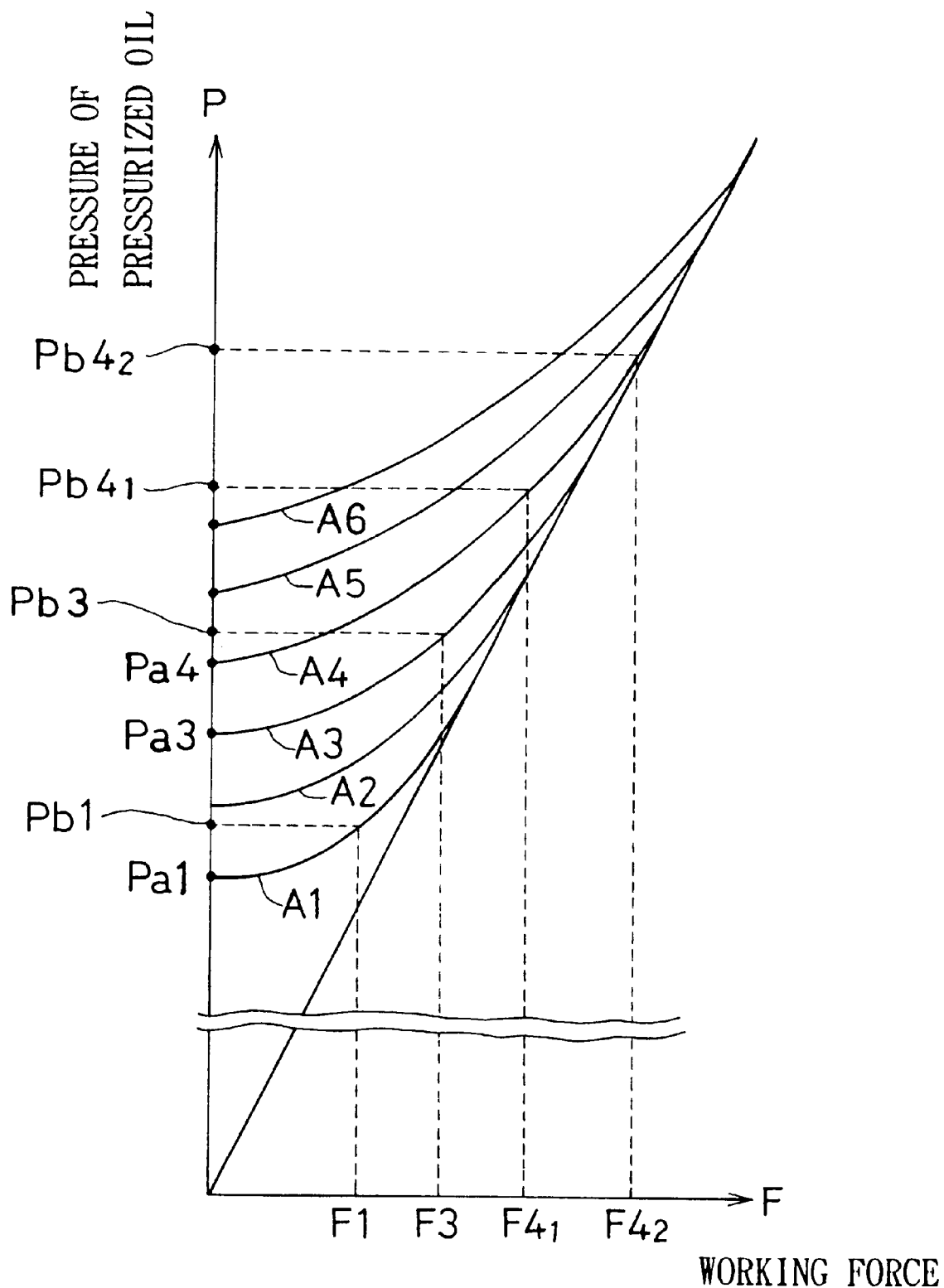
Figure 3:
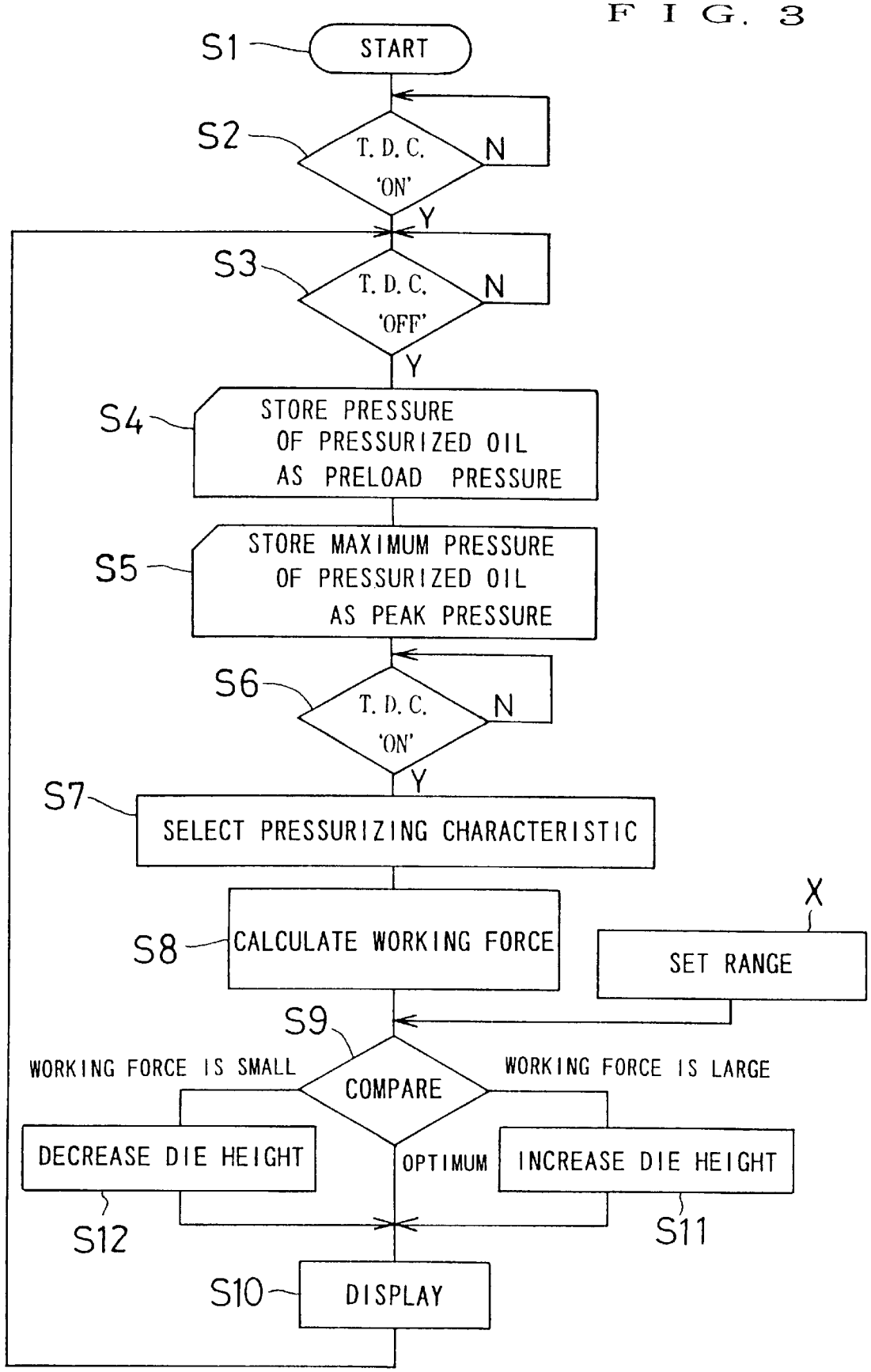

Hereafter, an embodiment of the present invention is explained by relying on FIGS. 1 to 3. First, construction of a crank-type mechanical press 1 and that of a device for measuring a working force during a press working are explained with reference to a system diagram of FIG. 1.

The mechanical press 1 has a frame 2 supporting a slide 3 vertically movably. The slide 3 has a bottom surface to which an upper die 4 is attached. A bolster 5 has an upper surface to which a lower die 6 is attached.

Formed within the slide 3 is a cylinder bore 10 of an overload protector, into which a piston 11 is inserted. The piston 11 has a lower side on which a hydraulic chamber 12 for absorbing overload is formed. The hydraulic chamber 12 is connected to a pneumatic and hydraulic booster pump 14 through a connecting passage 13. The booster pump 14 supplies pressurized oil of a set charging pressure (e.g., a pressure of about 10 MPa) to the hydraulic chamber 12. A driving force produced by a main electric motor (not shown) of the mechanical press 1 transmits to a work (not shown) via a flywheel 16, an eccentric shaft 17, a connecting rod 18, the piston 11, the pressurized oil within the hydraulic chamber 12 and a bottom portion of the slide 3, thereby subjecting the work to a press working with a predetermined working force.

When the pressure of the hydraulic chamber 12 has exceeded a set overload pressure (e.g., a pressure of about 23 MPa) with overload imposed on the slide 3 for any reason, an overload protecting valve 20 effects a relief operation to discharge the pressurized oil within the hydraulic chamber 12 to an oil reservoir 22 through the connecting passage 13, the overload protecting valve 20 and a discharge passage 21 in order. Thus a lowering force acting on the piston 11 is absorbed by a compressing operation of the hydraulic chamber 12 to be not transmitted to the slide 3. As a result, the overload can be prevented.

When the inner pressure of the hydraulic chamber 12 very slowly increases to have exceeded a set compensating pressure (a pressure which is a little higher than the set charging pressure and is, e.g., about 12 MPa), a pressure compensating valve (not shown) performs a relief operation to discharge the pressurized oil to the oil reservoir 22 by an amount corresponding to the very slow increase through the discharge passage 21. This can prevent the overload protecting valve 20 from effecting an overload operation by mistake and keep the inner pressure of the hydraulic chamber 12 within a predetermined range.

Fixed to the slide 3 is an electric motor 24 for adjusting a die height. Here the electric motor 24 extends and contracts the connecting rod 18 via a gear transmission mechanism 25, thereby being able to adjust the die height. The connecting rod 18 comprises an upper portion 18a and a lower portion 18b engaged with one another in screw-thread fitting.

The device for measuring a working force of the mechanical press 1 (so-called a load meter or a tonnage meter) comprises a pressure sensor 27 of strain-gauge type attached to the connecting passage 13, an angle sensor 28 for sensing a crank angle of the mechanical press 1, a control unit 29 connecting to these two sensors 27, 28 and a controller 30 for the electric motor 24.

A microcomputer 33 processes a signal sensed by the pressure sensor 27 via an analog-digital converter 32, and it processes a signal sensed by the angle sensor 28 as well. An output signal of the microcomputer 33 controls a display 34 and the controller 30.

Next, how the microcomputer 33 controls is explained.

The pressure of the pressurized oil to be charged into the hydraulic chamber 12 varies by changing a set value of a delivery pressure of the booster pump 14. In addition, it undergoes a slight variation even if it is set to a predetermined delivery pressure. Therefore, as shown in FIG. 2, a relationship between a pressure (P) of the pressurized oil which has been pressurized with a working force (F) during a press working and a largeness of the working force (F) is preliminarily measured for every predetermined initial pressure of the pressurized oil to be charged into the hydraulic chamber 12. The microcomputer 33 stores the measured results as a plurality of pressurizing characteristics (A1), (A2), (A3), (A4), (A5) and (A6).

The largeness of the working force (F) can be gained through multiplying a pressure of the pressurized oil within the hydraulic chamber 12 by a pressure receiving sectional area of the piston 11.

The operation of the microcomputer 33 is explained by relying on a flow chart of FIG. 3 with reference to FIGS. 1 and 2.

When control starts at step (S1), the microcomputer 33 becomes operable. At step (S2) the angle sensor 28 takes in a signal indicating that a crank angle (and the slide 3) have come to a top dead center (T.D.C.). At step (S3) the angle sensor 28 takes in a signal indicating that the crank angle has passed the top dead center.

Next, at step (S4) the pressure sensor 27 senses a pressure of the pressurized oil just after the crank angle has passed the top dead center. The sensed pressure is stored as a preload pressure (Pa1) (see FIG. 2). Here, for the convenience of explanation, the preload pressure (Pa1) is shown to have the same value as that of the initial pressure of the pressurizing characteristic (A1).

When the slide 3 performs a press working at a bottom dead center (B.D.C.) and in the vicinity thereof, a working force at that time increases the pressure of the pressurized oil within the hydraulic chamber 12. At step (S5) a maximum pressure of the pressurized oil is sensed until the crank angle comes to the top dead center again. The sensed pressure is stored as a peak pressure (Pb1) (see FIG. 2).

When the angle sensor 28 senses at step (S6) that the crank angle has come to the top dead center again, at step (S7) a pressurizing characteristic (A1) corresponding to the preload pressure (Pa1) is selected from among the plurality of pressurizing characteristics (A1), (A2), (A3), (A4), (A5) and (A6). Subsequently, at step (S8) a working force (F1) during the press working as calculated from the selected pressurizing characteristic (A1) and the peak pressure (Pb1) as shown in FIG. 2.

As such, each time the mechanical press 1 performs a press working, the preload pressure (Pa1) before the working is taken in to calculate a working force during the press working. Accordingly, since no error is caused by the change of the preload pressure (Pa1), it is possible to calculate an actual working force (F1) precisely.

Further, at step (S9) a set range (X) defined by preliminarily determined working forces is compared with the calculated working force (F1) to make calculation. In the event the calculated working force (F1) has a value falling within an optimum area of the set range (X), at stop (S10) the value of the calculated working force (F1) is displayed.

In the case where the calculated working force (F1) is close to an upper limit value of the set range (X) in the comparison made at the step (S9), it is judged to be too large. Then at step (S11) the die height adjusting electric motor 24 is driven in a direction for increasing the die height by a predetermined value and thereafter at the step (S10) the value of the working force (F1) is displayed. On the other hand, in the case where the calculated working force (F1) is close to a lower limit value of the set range (X), it is judged to be too small. Then at step (S12) the electric motor 24 is driven in a direction for decreasing the die height by a predetermined value and thereafter the value of the working force (F1) is displayed at the step (S10).

The above processing predicts a tendency of variation of a working force during a press working in advance, thereby being able to hold the working force within the set range (X). This further improves the working accuracy.

The steps (S7) and (S8) are explained in more detail as follows.

As shown in FIG. 2, in the case where the preload pressure is (Pa3) and the peak pressure is (Pb3), a working force (F3) is calculated from a pressurizing characteristic (A3) selected by the preload pressure (Pa3) and the peak pressure (Pb3).

Further, in the case where the preload pressure is (Pa4) and the peak pressure is ($Pb4_1$), a working force ($F4_1$) is calculated from a pressurizing characteristic (A4) selected by the preload pressure (Pa4) and the peak pressure ($Pb4_1$).

Moreover, in the case where the preload pressure is the (Pa4) and the peak pressure is ($Pb4_2$), a working force ($F4_2$) is calculated from the pressurizing characteristic (A4) and the peak pressure ($Pb4_2$).

Here, for the convenience of explanation, each of the preload pressures (Pa3) and (Pa4) is shown to have the same value as that of each of the initial pressures of the pressurizing characteristics (A3) and (A4). In the event that each of the preload pressures (Pa3) and (Pa4) is different from each of the initial pressures of the pressurizing characteristics (A3) and (A4), for example, it can be processed by the following procedures.

More specifically, the sensed preload pressure is compared with an initial pressure of each of the pressurizing characteristics (A3) and (A4). The working force (F) is calculated based on a pressurizing characteristic obtained by the comparison and on the peak pressure. In this case, a working force may be calculated based on a pressurizing characteristic added with two adjacent pressurizing characteristics (A3) and (A4). In other words, a new pressurizing characteristic is sought out by utilizing method of least squares, interpolation method, data table or the like.

Instead, a specific pressurizing characteristic may be selected from a plurality of pressurizing characteristics through the comparison. In other words, a working force is calculated by selecting a pressurizing characteristic provided with an initial pressure closest to either of the preload pressures (Pa3) and (Pa4). In this event, there are considered two cases. In one case, a specific pressurizing characteristic is only selected. In the other case, a specific pressurizing characteristic is selected and then calculated.

If constructed as above, a working force can be calculated based on a pressurizing characteristic most corresponding to the sensed preload pressure, which results in the possibility of calculating an actual working force during a press working more precisely.

By the way, in general, the working force during the press working of the mechanical press 1 varies complicatedly due to thermal strains of the frame 2 and the driving force transmission system. For instance, when the atmospheric temperature at the installation site of the mechanical press 1 increases, the frame 2 expands to lengthen a distance between the upper and lower metal dies 4 and 6 shown in FIG. 1. Conversely, when the atmospheric temperature decreases, the frame 2 contracts to shorten the distance between the upper and lower metal dies 4 and 6. Additionally, as the press working continues, the slide 3, the connecting rod 18 and the like increase their temperatures to expand, which results in shortening the distance between the upper and lower metal dies 4 and 6 shown in FIG. 1.

As such, in correspondence with the operation conditions, the distance between the upper and lower metal dies 4 and 6 complicatedly varies and the work to be supplied changes in thickness and hardness. Then the working force during the press working tends to vary as well. However, it is possible to retain the working force (F) within the preliminarily determined set range (X) through adjusting the die height by the electric motor 24 based on the precisely calculated working force (F1). This keeps the working force during the press working almost constant and improves the working accuracy.

The above-mentioned embodiment can be modified as follows.

In the flow chart of FIG. 3, the step (S7) of selecting a pressurizing characteristic based on a preload pressure may be effected between the step (S4) of storing a preload pressure and the step (S5) of storing a peak pressure.

The upper and lower limit values of the set range (X) of the working forces in FIG. 3 may be set by a ratio of a working force to a full load capacity of the mechanical press instead of by a working force such as tonnage.

The plurality of pressurizing characteristics (A1), (A2), (A3), (A4), (A5) and (A6) may be preliminarily accumulated general data which have been stored in the microcomputer 33 or those obtained by actual measurements made for the respective mechanical presses to which the present invention is applied and stored in the microcomputer 33.

The microcomputer 33 is satisfactory even if it is provided with only one pressurizing characteristic adaptable to a used mechanical press instead of being provided with the plurality of pressurizing characteristics.

Two set values of an upper limit value and a lower limit value may be provided instead of the set range (X) in FIG. 3. In the case where the calculated working force (F1) is not less than the upper limit value, the electric motor 24 is driven in a direction for increasing the die height, and on the other hand in the case where the calculated working force (F1) is not more than the lower limit value, the electric motor 24 is driven in a direction for decreasing the die height, so as to retain the working force (F) during the press working within a desired range. In this event, the working force can be kept within the desired range only by providing two set values of the upper and lower limit values. This can improve the working accuracy with a simple construction.

The set value may be only one instead of providing two ones of the upper and lower limit values.

The means which senses the top dead center of the crank angle may be a limit switch, a proximity switch or the like instead of the exemplified angle sensor 28.

The means which senses the pressure of the pressurized oil within the hydraulic chamber 12 may be an electrical capacitance pressure sensor, an electromagnetic induction pressure sensor or the like instead of the exemplified pressure sensor 27 of strain-gauge type.

The time for sensing the initial pressure of the pressurized oil charged into the hydraulic chamber 12 is not limited to the top dead center position but it may be the time when a large load during the press working does not act on the hydraulic chamber 12. In consequence, the initial pressure may be sensed during the term which extends to the top dead center position after the press working or during the term which prolongs from the top dead center position to just before the press working.

An actuator for adjusting the die height may be a hydraulic, pneumatic or the like actuator instead of the exemplified electric motor 24.

The mechanical press 1 to which the present invention is applied may be a knuckle-type or a link-type or the like one instead of the exemplified crank-type one.

What is claimed is:

1. A method for measuring a working force of a mechanical press, said mechanical press (1) having a variable die height and a slide (3) defining an overload absorbing hydraulic chamber (12) containing pressurized oil arranged to transmit a driving force to the slide (3) by further pressurization of said oil, the method comprising the steps of:

storing in a computer (33) a relationship between a pressure (P) of the pressurized oil upon pressurization by a working force (F) during a pressing operation of said press and a magnitude of the working force (F) as at least one pressurizing characteristic in relation to an initial pressure of the oil prior to said pressing operation;

determining by said computer the working force for each pressing operation, the step of determining the working force includes detecting and storing a preload pressure (Pa1) defined as the pressure of the oil before the pressing operation, detecting and storing a peak pressure (Pb1) defined as the maximum pressure of the oil during pressing operation, and calculating a working force (F1) based on a pressurizing characteristic (A1) corresponding to the preload pressure (Pa1) and on the peak pressure (Pb1); and wherein said computer is connected to an actuator arranged to adjust said die height based on a comparison between said calculated working force and a predetermined criteria (X) to thereby maintain operation of said press near said predetermined criteria.

2. A device for measuring a working force of a mechanical press having a variable die height comprising:

a slide defining an overload absorbing hydraulic chamber (12) containing pressurized oil arranged to transmit a driving force to the slide (3);

a pressure sensing device (27) positioned to detect a pressure of the oil;

and a computer (33) configured to receive the detected signal of the pressure sensing device (27), the computer (33) being arranged to store a relationship between a pressure (P) of the pressurized oil upon pressurization by a working force (F) during a pressing operation of said press and a magnitude of the working force (F) as at least one pressurizing characteristic (A1, A2, A3, A4, A5, A6 in relation to an initial pressure of the pressurized oil prior to pressurization, and to calculate a working force (F1) for said pressing operation based on a pressurizing characteristic (A1) corresponding to a preload pressure (Pa1) detected before said pressing operation and a peak pressure (Pb1) of the pressurized oil which has been pressurized during the pressing operation;

wherein said computer is connected to an actuator arranged to adjust said die height based on a comparison between said calculated working force and a predetermined criteria (X) to thereby maintain operation of said press within said predetermined criteria.

3. The device for or measuring a working force of a mechanical press as set forth in claim 2, wherein the computer (33) stores a plurality of pressurizing characteristics (A1), (A2), (A3), (A4), (A5) and (A6) for predetermined initial pressures of the pressurized oil to be pressurized, respectively and selects at least one pressurizing characteristic (A1) corresponding to the preload pressure (Pa1) from among the plurality of pressurizing characteristics (A1), (A2), (A3), (A4), (A5) and (A6) to calculate a working force (F1) based on the selected at least one pressurizing characteristic (A1) and the peak pressure (Pb1).

4. The device for measuring a working force of a mechanical press as set forth in claim 2, wherein said predetermined criteria (X) is defined by a predetermined range including an upper limit and a lower limit such that when the calculated working force (F1) is close to an upper limit value of the predetermined range (X), the actuator (24) increases the die height, and wherein when the calculated working force (F1) is close to a lower limit value of the predetermined range (X), the actuator (24) decreases the die height.

5. The device for measuring a working force of a mechanical press as set forth in claim 2, wherein said predetermined criteria (X) is defined by two set values of an upper limit value and a lower limit value such that when the calculated working force (F1) is greater than the upper limit value, the actuator (24) increases the die height, and wherein where the calculated working force (F1) is less than the lower limit value, the actuator (24) decreases the die height.

6. The device for measuring a working force of a mechanical press as set forth in claim 2, wherein the detected preload pressure (Pa1) is compared with an initial pressure of the at least one pressurizing characteristic (A1, A2, A3, A4, A5, A6) and the working force (F1) is calculated based on a pressurizing characteristic obtained by the comparison and on the peak pressure (Pb1).

7. The device for measuring a working force of a mechanical press as set forth in claim 3, wherein the detected preload pressure (Pa1) is compared with an initial pressure of the at least one pressurizing characteristic (A1, A2, A3, A4, A5, A6) and the working force (F1) is calculated based on a pressurizing characteristic obtained by the comparison and on the peak pressure (Pb1).

8. The method for measuring a working force of a mechanical press as set forth in claim 1, wherein the detected preload pressure (Pa1) is compared with an initial pressure of the at least one pressurizing characteristic (A1, A2, A3, A4, A5, A6) and the working force (F1) is calculated based on a pressurizing characteristic obtained by the comparison and on the peak pressure (Pb1).

* * * * *